US009962777B2

(12) United States Patent
Rogers et al.

(10) Patent No.: US 9,962,777 B2
(45) Date of Patent: May 8, 2018

(54) ALIGNMENT TOOL FOR SHEET MATERIAL SHEARS

(71) Applicants: William D Rogers, Bentley, LA (US); Richard D Rogers, Bentley, LA (US)

(72) Inventors: William D Rogers, Bentley, LA (US); Richard D Rogers, Bentley, LA (US)

( * ) Notice: Subject to any disclaimer, the term of this patent is extended or adjusted under 35 U.S.C. 154(b) by 0 days. days.

(21) Appl. No.: 15/256,900

(22) Filed: Sep. 6, 2016

(65) Prior Publication Data

US 2017/0072480 A1  Mar. 16, 2017

Related U.S. Application Data

(60) Provisional application No. 62/283,778, filed on Sep. 10, 2015, provisional application No. 62/390,764, filed on Apr. 8, 2016.

(51) Int. Cl.
  *B23D 35/00* (2006.01)
  *B23D 33/08* (2006.01)

(52) U.S. Cl.
  CPC ............ *B23D 35/005* (2013.01); *B23D 33/08* (2013.01)

(58) Field of Classification Search
  CPC ................................ B23D 35/005; B23D 33/08
  USPC .......................................................... 83/529
  See application file for complete search history.

(56) References Cited

U.S. PATENT DOCUMENTS

| | | | | |
|---|---|---|---|---|
| 2,323,319 A * | 7/1943 | Finnell | ..................... | B27G 5/02 409/225 |
| 4,252,041 A * | 2/1981 | Cros | .................... | B23D 33/025 83/157 |
| 8,312,801 B2 * | 11/2012 | Sundquist, III | ...... | B23D 35/005 83/640 |
| 2003/0041709 A1 * | 3/2003 | Jones | ................... | B23D 51/025 83/13 |
| 2004/0200331 A1 * | 10/2004 | Chen | .................... | B23D 51/025 83/574 |
| 2009/0223060 A1 * | 9/2009 | Zeitlin | ................... | B26B 11/00 30/136 |

FOREIGN PATENT DOCUMENTS

DE            2523966 A1 * 12/1976 ............. B23D 33/08

* cited by examiner

*Primary Examiner* — Omar Flores Sanchez
(74) *Attorney, Agent, or Firm* — Rodney Bryant Jordan

(57) ABSTRACT

An apparatus for improving the accuracy of machines which shear plate materials in general and sheet metals in particular. The apparatus comprises an indicator that is magnetically mounted to the shearing blade and extends downward toward the work table of the machine to give an indication of where the blade will pass through the metal.

8 Claims, 5 Drawing Sheets

ALIGNMENT TOOL FOR SHEET MATERIAL SHEARS

CROSS-REFERENCE TO RELATED APPLICATIONS

Applications for which benefit is being claimed:
1. Provisional application No. 62/283,778 filed by William D. Rogers and Richard D Rogers entitled Plate Shear Guide Bars (Line Finder) on Sep. 10, 2015.
2. provisional application No. 62/390,764 filed by William D Rogers and Richard D Rogers on Apr. 8, 2016 entitled Line Finder and Holding System for Brakes and Shears.

BACKGROUND OF THE INVENTION

Manufacturing of metal goods has long been an important part of our national economy and a major source of our national wealth. As competition from a global economy pressures our manufacturing base, it becomes extremely important that metal working machines be improved in productivity, accuracy and quality of work produced. One such group of machines are metal brakes, coper notchers, and particularly, shears. At present, sheet metal shears, although adequate in most respects, are difficult with regard to accuracy of cut. These machines consist primarily of two knives, one movable and one stationary. In most cases the lower knife is stationary and the upper knife is moved up and down. In order to accommodate materials of different thickness, there must be a considerable amount of space between the two knives while the machine is at rest. In order to minimize the force needed to make the cut, the upper, moving knife must have a cutting surface that is at an angle, called a rake angle, with respect to the lower, stationary knife. These factors leave the operator with no way to align the cut other than viewing and aligning with the edge of the lower knife. Often the plate is as wide as the bottom blade leaving it totally hidden. The cutting line on which the stock is to be sheared is, of course, drawn on the top surface of the stock. It is not possible for the operator to look straight down at the stock being sheared as the knives are recessed within the machine for safety and other purposes, therefore the operator must guess at the proper alignment. As thickness of stock being sheared increases, the difficulty of alignment increases. The result is lost work time and ruined material, decreasing the quality of work and the efficiency with which it is done. The manufacturer is left with a great need for a more efficient method of alignment. The present invention fulfills this need by providing a tool by which the desired line of cut by a sheet metal shear or similar device can easily and accurately be obtained.

DESCRIPTION OF THE PRIOR ART

At present, accurate cutting with shearing machines is accomplished by use of an apparatus mounted behind the cutting knife which provides a stop for the material being sheared. Such devices require adjustment for individual cuts. In addition, these devices provide only for square cutting and do not accommodate cutting stock at an angle. Solutions to these problems were offered in the provisional application No. 62/283,778 filed by William D. Rogers and Richard D Rogers entitled Plate Shear Guide Bars (Line Finder) on Sep. 10, 2015. Further solutions were offered in the provisional application No. 62/390,764 filed by William D Rogers and Richard D Rogers on Apr. 8, 2016 entitled Line Finder and Holding System for Brakes and Shears. These solutions are further addressed by this application.

DETAILED DESCRIPTION

Figure 1:
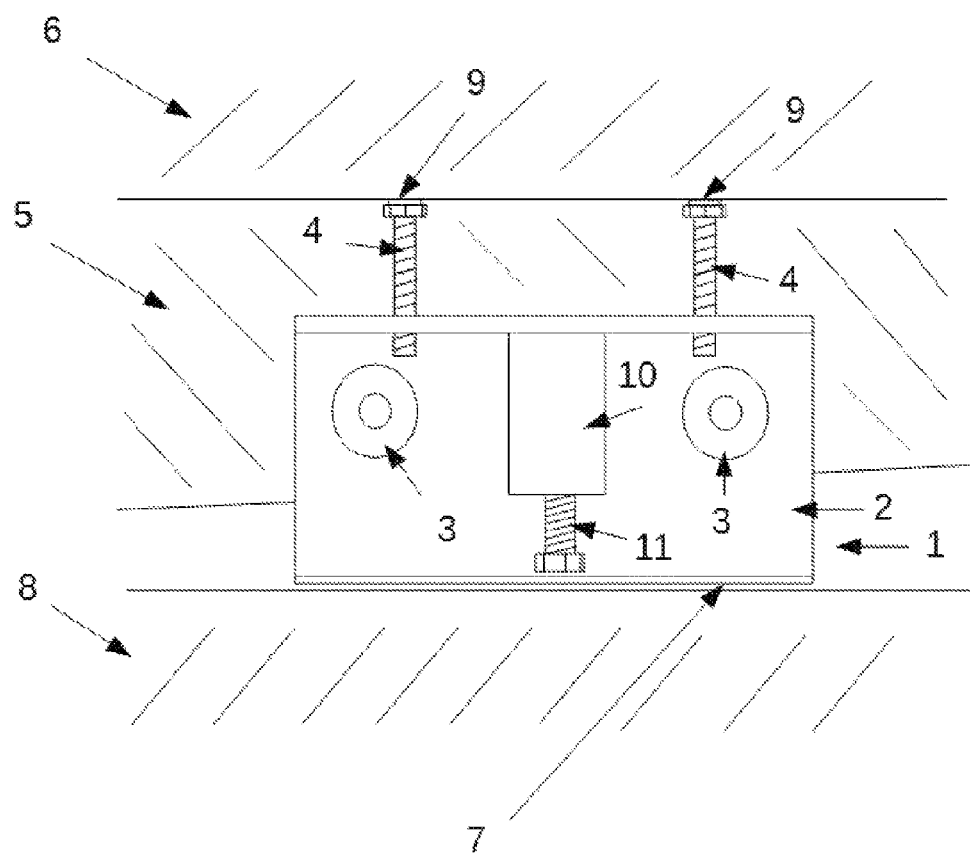
FIG. 1 is a front elevation view of the shear alignment tool mounted to a sheet metal shear.
Figure 2:
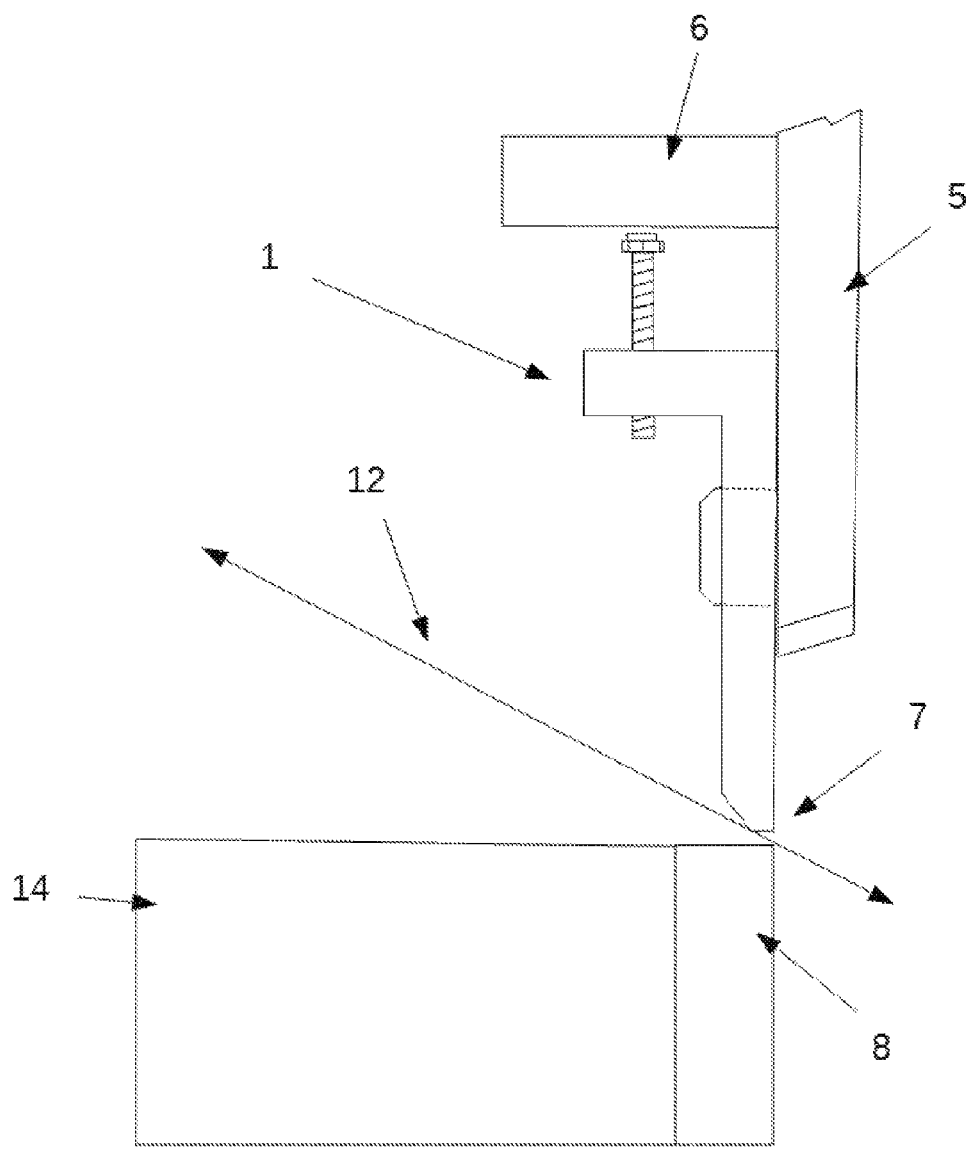
FIG. 2 is a side elevation view of the shear alignment tool showing the angle of sight of an operator.
Figure 3:
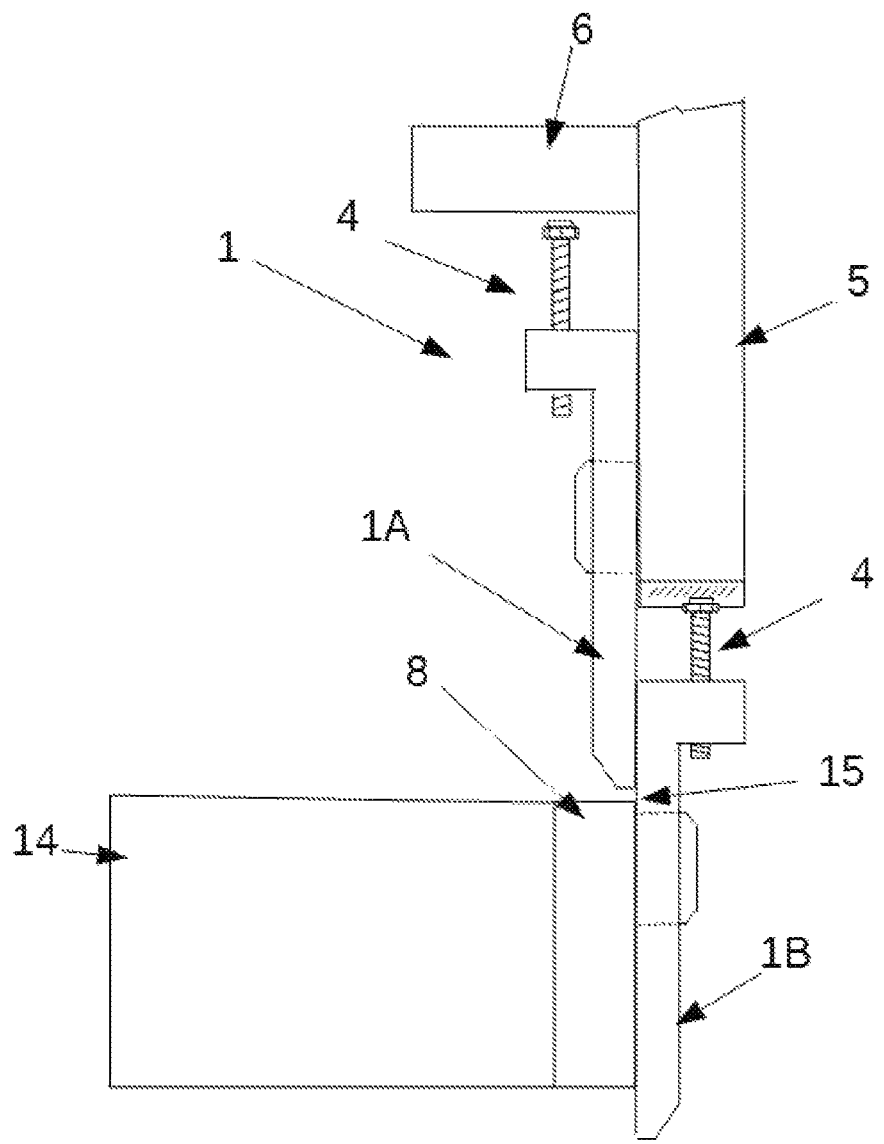
FIG. 3 is a side elevation view showing two shear alignment tools affixed to a shear, one to the front side of the upper knife, and one to the back side of the lower knife.
Figure 4:
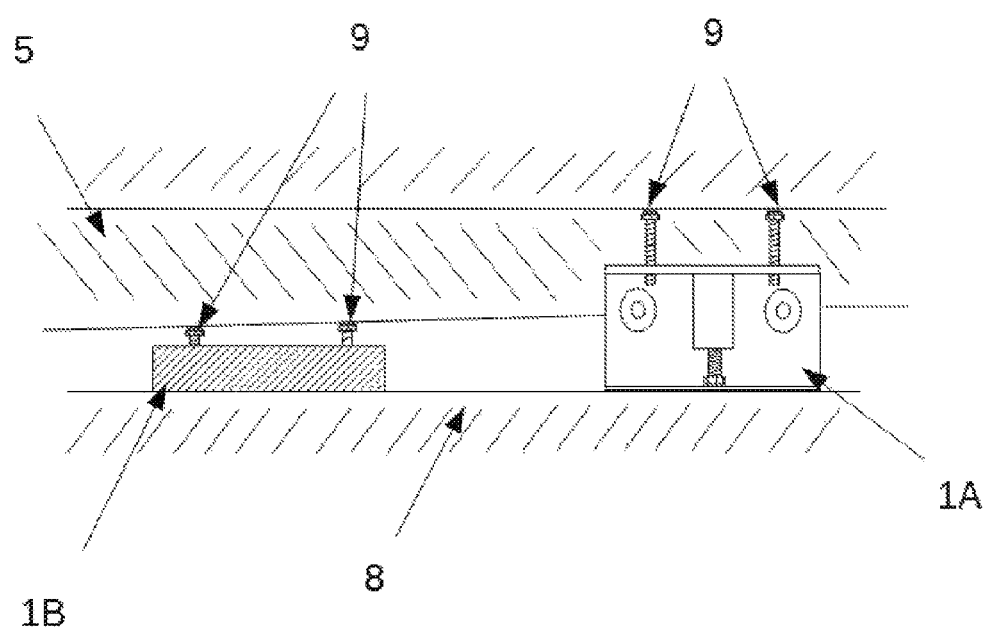
FIG. 4 is a front elevation view of the two-shear alignment tool mounting arrangement.
Figure 5:
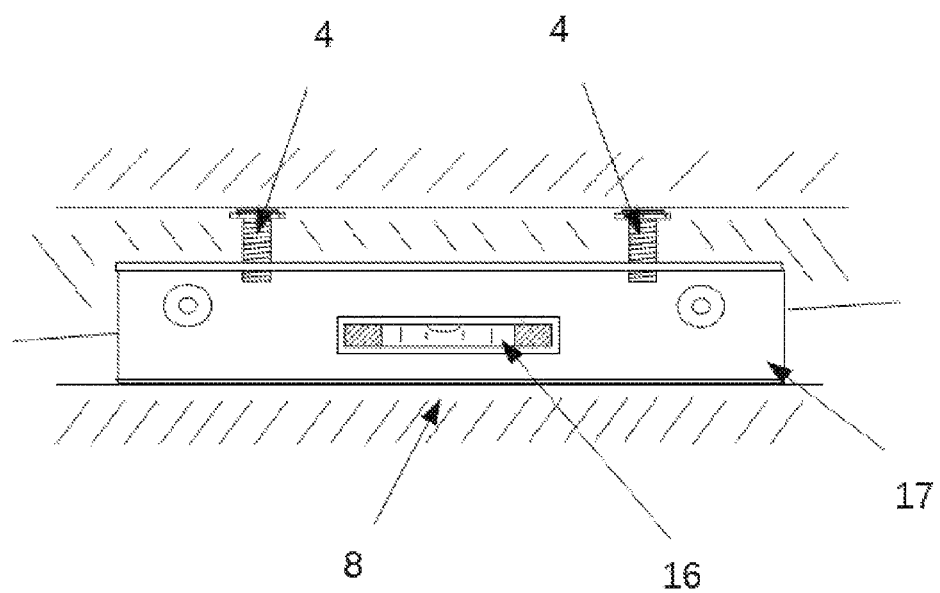
FIG. 5 is a front elevation view of an elongated shear alignment tool equipped with a level.

Referring to the drawings and more specifically to figure one, it can be seen that the shear alignment tool 1 comprises essentially a base 2, a set of facial magnets 3 imbedded into base 2, and two adjustment screws 4. Base 2 is formed from non-magnetic material such as aluminum or plastic. This assures that the magnetic attraction is applied at the proper place and keeps magnetic waste materials from clinging to the tool. Facial magnets 3 are positioned in base 2 so as to make contact and thus magnetically adhere to upper knife 5. Adjustment screws 4 are so adjusted so as to make contact with frame 6 located above upper knife 5 while providing the desired opening between line identifying edge 7 of shear alignment tool 1 and lower knife 8. Adjustment screw magnets 9 are affixed to the upper ends of adjustment screws 4. These magnets affix the upper ends of adjustment screws 4 to frame 6. In some shears, frame 6 may not be located or formed in a suitable way to accommodate adjustment screws 4. In such a case, a special adapter bar may be mounted on the shear for this purpose. Both frame 6 and lower knife 8 are immovable thus the position of line identifying edge 7 above lower knife 8, as determined by adjustment screws 4, is maintained. Through the use of adjustment screws 4, the space between line identifying edge 7 and lower knife 8 is set to be just larger than the thickness of the material being sheared. Upper knife 5, lower knife 8, and line identifying edge 7 are in the same vertical plane. Line identifying edge 7 is also set to be parallel to lower knife 8 so as to maintain a constant space width. By producing this small, even space between line identifying edge 7 and lower knife 8, the rake angle is effectively eliminated and the distance between upper knife 5 and lower knife 8 is effectively reduced to a manageable level for the operator. As upper knife 5 lowers during the shearing process, shear alignment tool 1 continues to magnetically adhere to upper knife 5 as the surface of upper knife 5 slides along the shear alignment tool 1. Shear alignment tool 1 is maintained at its fixed position by way of sliding action of upper knife 5 against facial magnets 3 and by the fixed position magnets 9. During reset of upper knife 5, adjustment screws 4 force shear alignment tool 1 to maintain its position relative to lower knife 8, returning the setting to its rest position.

Also referring to figure one, it can be seen that close hold down accessory 10 is affixed to shear alignment tool 1. Hold down adjustment screw 11 can be adjusted so as to contact, or nearly contact, the surface of the stock being sheared. Close hold down provides a means for holding material stationary after it becomes too short to reach the OEM standard hold down mechanism. This will allow the use of remnants now thrown in the scrap bin.

Referring to figure two, it can be seen that the bottom of shear alignment tool 1 is tapered so as to produce a very thin lower line identifying edge 7. As the operator uses shear alignment tool 1, he can ascertain his line of sight 12 according to his height and posture. Through the skill naturally acquired and the freedom from blockage provided by the tapered line identifying edge 7, the space between line identifying edge 7 and the stock being sheared is further negated for a near perfect shear. Also depicted are upper knife 5, lower knife 8, frame 6, and work table 14. For simplification, close hold down accessory 10 is not depicted.

Referring to figure three, it can be seen that two shear alignment tools 1 may be used in order to obtain an accurate shear while shearing wide pieces of plate. Again for simplification, close hold down accessory 10 is not depicted. In figure three, one of the shear alignment tools 1A is mounted and used as described above. Another shear alignment tool 1B is placed on the back side of lower knife 8 and affixed magnetically to lower cutting edge 13 of upper knife 5 by way of adjustment screw magnets 9 and to lower knife 8 by the attraction of facial magnets 3. The rake angle of upper knife 5 is shown in the drawing as hashed lines. This angle may cause shear alignment tool 1B to be mounted in a tilted position relative to lower knife 8. Further adjustment of adjustment screws 4 may be made in order to obtain a level position if desired. A tilted position poses no operational problem as side edge 15 of shear alignment tool 1B, due to its tilted position, will move away from the edge of the stock being sheared as upper knife 5 moves it downward. This allows shear alignment tool 1B to move up and down with the movement of upper knife 5 while maintaining contact with lower knife 8. Adjustment screw magnets 9, maintaining contact with upper knife 5 assured the return of shear alignment tool 1B to its rest position after the shear is complete. This gives the operator an indication of the location of the knives that can be seen from a distance as well as an angle. Through this placement of shear alignment tools, the operator may use line identifying edge 7 to align the stock in front of him while using the side edge 15 of shear alignment tool 1B for the alignment of the stock far to his left or right. The operator may also look from the side of both shear alignment tools, using the very edge of both tools to acquire a near perfect setting along the line to be sheared. Likewise, in the one shear alignment tool application, a series of arches or notches may be cut into the bottom of shear alignment tool 1. In this case, a series of views of the absolute position of line identifying edge 7 with regard to the layout line on which the stock is being sheared is provided.

Referring to figure four, it can be seen that shear alignment tool 1B is affixed to the rear of lower knife 8 and being held in place magnetically by adjustment screw magnets 9. It can also be seen that shear alignment tool 1A is magnetically affixed to upper knife 5 and held fast to frame 6 by adjustment screw magnets 9. As upper knife 5 lowers to make the cut, shear alignment tool 1B slides along lower knife 8 and shear alignment tool 1A remains fixed as upper knife 5 slides along its surface. After the shear is made, as upper knife 5 raises, shear alignment tool 1B is returned to its rest position. The position of shear alignment tool 1A remains fixed as upper knife 5 regains its relative position with shear alignment tool 1A.

Shear alignment tools 1A and 1B may also be used wherein both tools are located on the operator's side of the shear. In fact, it is often advantageous to use multiple tools in this configuration, especially when wide sheets of stock are being sheared. Also, shear alignment tools of different lengths may be employed, depending upon the needs of the operator. In such uses, it is important that the entire line identifying edge be parallel to the cutting edge of lower knife 8 in order to obtain an accurate cut. In figure five, it can be seen that this is accomplished by the presence of a level 16 properly affixed to elongated shear alignment tool 17. With the shear machine being installed so that lower knife 8 is level, line identifying edge 7 can be set parallel to lower knife 8 by use of adjustment screws 4 and level 16.

Through this multifaceted tool, the operator is given several methods of alignment, all of which provide a massive improvement in accuracy with regard to the use of shears and other similar tools.

We claim:

1. A device to be used with a plate shearing machine for accurately aligning the line of shear with a prescribed line on the plate to be sheared, said device comprising a means for attaching said device to said shearing machine, a means for adjusting said device to said shearing machine, and a means for aligning said line of shear to said prescribed line, said device further comprising an upper knife, said upper knife having a front side, a back side, and a bottom flat side, said machine further comprising a lower knife, said lower knife having a back side and a cutting edge, said knives being generally flat, said lower knife being fixed and said upper knife being vertically moveable, said means for attaching said device to said shearing machine further comprising a non magnetic plate having a front side and a back side and a plurality of magnets, said magnets being imbedded into said plate so as to adhere to said front side of said upper knife and to slide along said surface as said upper knife is lowered while maintaining a constant location with regard to said lower knife, said device further comprising two side edges, said device being adhered by said magnets to said back side of said lower knife, wherein said means for adjusting said device to said shearing machine comprises a set of adjusting screws and a set of adjusting screw magnets, each of said adjusting screws having a top and bottom end, said magnets being permanently affixed to said top ends of said adjusting screws and magnetically affixed to said flat bottom side of said upper knife, said bottom ends of said adjusting screws being threaded into said device.

2. A device to be used with a plate shearing machine for accurately aligning the line of shear with a prescribed line on the plate to be sheared, said device comprising a means for attaching said device to said shearing machine, a means for adjusting said device to said shearing machine, and a means for aligning said line of shear to said prescribed line, said device further comprising an upper knife, said upper knife having a front side, a back side, and a bottom flat side, said machine further comprising a lower knife, said lower knife having a back side and a cutting edge, said knives being generally flat, said lower knife being fixed and said upper knife being vertically moveable, said means for attaching said device to said shearing machine further comprising a non magnetic plate having a front side and a back side and a plurality of magnets, said magnets being imbedded into said plate so as to adhere to said front side of said upper knife and to slide along said surface as said upper knife is lowered while maintaining a constant location with regard to said lower knife wherein, said means for adjusting said device to said shearing machine comprises a set of adjusting screws and a set of adjusting screw magnets, each said adjusting screw having a top end and a bottom end, said magnets being permanently affixed to said top ends of said adjusting screws and magnetically affixed to said frame said bottom ends of said adjusting screws being threaded into said device.

3. A device as described in claim 2, wherein said means for adjusting said device further comprises a level, said level being affixed to said device parallel to said cutting edge and therefore said line of shear.

4. A device as described in claim 2 having a top edge and a bottom edge, wherein said means for aligning said line of shear to said prescribed line comprises a line indicator edge, said line indicator edge comprising said bottom edge of said device, said bottom edge being adjusted so as to be parallel to and suitably near said cutting edge of said lower knife.

5. A device as described in claim 4 to be used by a craftsman, wherein said bottom edge of said device is formed to angle away from said front side of said device so as to give said craftsman a line of sight directly to said prescribed line.

6. A device as described in claim 5, wherein said bottom edge further comprises a plurality of notches, said notches allowing said line of sight to fall on said line of shear directly above said prescribed line at a plurality of places along said line of shear.

7. A device as described in claim 6 wherein, said device further comprises a close hold down mechanism said mechanism being affixed to said front side of said plate.

8. A device to be used with a plate shearing machine for accurately aligning the line of shear with a prescribed line on the plate to be sheared, said device comprises a non magnetic plate, a plurality of magnets, said magnets being imbedded into said plate, two adjustment screws, said screws having upper ends and lower ends, said upper ends further comprising magnets, said upper ends of said screws being magnetically affixed to said plate shearing machine, said lower ends being threaded into said device.

* * * * *